United States Patent
Baughman et al.

(10) Patent No.: US 11,895,344 B1
(45) Date of Patent: Feb. 6, 2024

(54) DISTRIBUTION OF MEDIA CONTENT ENHANCEMENT WITH GENERATIVE ADVERSARIAL NETWORK MIGRATION

(71) Applicant: International Business Machines Corporation, Armonk, NY (US)

(72) Inventors: Aaron K. Baughman, Cary, NC (US); Jeremy R. Fox, Georgetown, TX (US); Zachary A. Silverstein, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/063,747

(22) Filed: Dec. 9, 2022

(51) Int. Cl.
*H04N 21/2343* (2011.01)
*H04N 21/234* (2011.01)
*H04N 21/25* (2011.01)
*H04N 21/24* (2011.01)

(52) U.S. Cl.
CPC ........... *H04N 21/234327* (2013.01); *H04N 21/23418* (2013.01); *H04N 21/23439* (2013.01); *H04N 21/2402* (2013.01); *H04N 21/251* (2013.01)

(58) Field of Classification Search
None
See application file for complete search history.

(56) References Cited

U.S. PATENT DOCUMENTS

| | | | |
|---|---|---|---|
| 10,872,297 B2 | 12/2020 | Kim | |
| 11,010,637 B2 | 5/2021 | Visentini Scarzanella | |
| 11,087,025 B2 | 8/2021 | Santana De Oliveira | |
| 11,238,877 B2 | 2/2022 | Chang | |
| 11,271,984 B1* | 3/2022 | Sivaswamy | H04L 65/764 |
| 11,315,343 B1 | 4/2022 | Pei | |
| 11,689,601 B1* | 6/2023 | Fox | H04N 21/234354 709/231 |
| 11,743,552 B1* | 8/2023 | Moyal | H04N 21/41407 709/219 |
| 11,799,920 B1* | 10/2023 | Kammara | H04L 65/1069 |
| 2020/0007916 A1* | 1/2020 | Keen | H04N 21/26258 |
| 2020/0082250 A1 | 3/2020 | Guan | |
| 2020/0311558 A1 | 10/2020 | Tan | |

(Continued)

OTHER PUBLICATIONS

Hui et al., "Knowledge Enhanced GAN for IoT Traffic Generation", WWW '22 ACM Web Conference, Apr. 25-29, 2022, 10 Pages.

(Continued)

*Primary Examiner* — June Sison
(74) *Attorney, Agent, or Firm* — Stephanie L. Carusillo

(57) ABSTRACT

In an approach for optimizing the enhancement of media content using a Generative Adversarial Network (GAN), a processor identifies a degree of enhancement to be performed on the media content to attain the defined quality. A processor calculates a length of time required to enhance the media content to the degree of enhancement identified considering one or more factors. A processor identifies a buffer required to enhance the media content to the degree of enhancement identified, wherein the buffer prevents an interruption in the media content. A processor identifies a distribution to enhance the media content between a cloud hosted server and a user computing device. A processor enhances the media content according to the distribution identified.

20 Claims, 3 Drawing Sheets

(56) References Cited

U.S. PATENT DOCUMENTS

| | | | |
|---|---|---|---|
| 2020/0349682 A1* | 11/2020 | Mayol Cuevas | G06V 10/776 |
| 2020/0380366 A1 | 12/2020 | Wang | |
| 2020/0387739 A1 | 12/2020 | Williams | |
| 2021/0271933 A1 | 9/2021 | Zhong | |
| 2022/0114380 A1 | 4/2022 | Sankaradas | |
| 2022/0150560 A1* | 5/2022 | Kasal | H04N 21/44209 |
| 2022/0167005 A1* | 5/2022 | Asif | H04N 19/54 |
| 2023/0091912 A1* | 3/2023 | Covell | G06N 20/00 |
| | | | 725/32 |

OTHER PUBLICATIONS

Mitra et al., "EasyDeep: An IoT Friendly Robust Detection Method for GAN Generative Deepfake Images in Social Media", IFIPIoT Conference, Feb. 24, 2022, 18 Pages.

Nagisetty et al.; "xAI-GAN: Enhancing Generative Adversarial Networks Via Explainable AI Systems", Cornell University Library, arXiv:2002.10438v3, Mar. 29, 2022, 9 Pages.

Nguyen et al., "Federated Learning for COVID-19 Detection With Generative Adversarial Networks in Edge Cloud Computing", Cornell University Library, arXiv:2110.07136v1, Oct. 14, 2021, 14 Pages.

Xie et al.,"Web3D Client-Enhanced Global Illumination Via GAN for Health Visualization", IEEE Access, vol. 8, Dec. 24, 2019, 12 Pages.

\* cited by examiner

US 11,895,344 B1

DISTRIBUTION OF MEDIA CONTENT ENHANCEMENT WITH GENERATIVE ADVERSARIAL NETWORK MIGRATION

BACKGROUND

The present invention relates generally to the field of data processing, and more particularly to distribution of media content enhancement with Generative Adversarial Network (GAN) migration.

GAN is an approach to generative modeling using a deep learning method, such as a convolutional neural network. Generative modeling is an unsupervised learning task in machine learning that involves automatically discovering and learning a regularity or a pattern in input data in such a way that a model can be used to generate and output new examples that plausibly could have been drawn from the original dataset.

SUMMARY

Aspects of an embodiment of the present invention disclose a method, computer program product, and computer system for optimizing the enhancement of the media content using a Generative Adversarial Network (GAN). Responsive to determining a media content of a defined quality is unavailable on a cloud hosted server, a processor identifies a degree of enhancement to be performed on the media content to attain the defined quality. A processor calculates a length of time required to enhance the media content to the degree of enhancement identified considering one or more factors. A processor identifies a buffer required to enhance the media content to the degree of enhancement identified, wherein the buffer prevents an interruption in the media content. A processor identifies a distribution to enhance the media content between a cloud hosted server and the user computing device. A processor enhances the media content according to the distribution identified.

In some aspects of an embodiment of the present invention, the one or more factors are selected from a group consisting of a set of configurations of the user computing device, a network bandwidth of the user computing device, a data plan of the user computing device, and a cloud service cost.

In some aspects of an embodiment of the present invention, a processor identifies an available network bandwidth. Responsive to determining the media content can be enhanced on the cloud hosted server based on the available network bandwidth, a processor determines the network bandwidth can stream an enhanced media content. A processor plans to perform a GAN based enhancement of the media content on the cloud hosted server.

In some aspects of an embodiment of the present invention, a processor identifies the available network bandwidth. Responsive to determining the media content cannot be completely enhanced on the cloud hosted server based on the available network bandwidth, a processor determines the GAN based enhancement of the media content can be performed on the user computing device. A processor plans to perform the GAN based enhancement of the media content on the cloud hosted server and the user computing device.

In some aspects of an embodiment of the present invention, a processor determines the user computing device does not exist in a multi-device ecosystem. A processor identifies a set of configurations of the user computing device. A processor estimates a latency of the user computing device to enhance the media content. A processor determines how much of the media content can be enhanced on the network bandwidth based on a comparison between the latency of the user computing device and the network bandwidth.

In some aspects of an embodiment of the present invention, a processor determines the user computing device exists in a multi-device ecosystem. A processor identifies a set of configurations of each user computing device in the multi-device ecosystem. A processor estimates a latency of each user computing device in the multi-device ecosystem to enhance the media content.

In some aspects of an embodiment of the present invention, subsequent to enhancing the media content, a processor presents an enhanced version of the media content.

These and other features and advantages of the present invention will be described in, or will become apparent to those of ordinary skill in the art in view of, the following detailed description of the example embodiments of the present invention.

DETAILED DESCRIPTION

Figure 1:
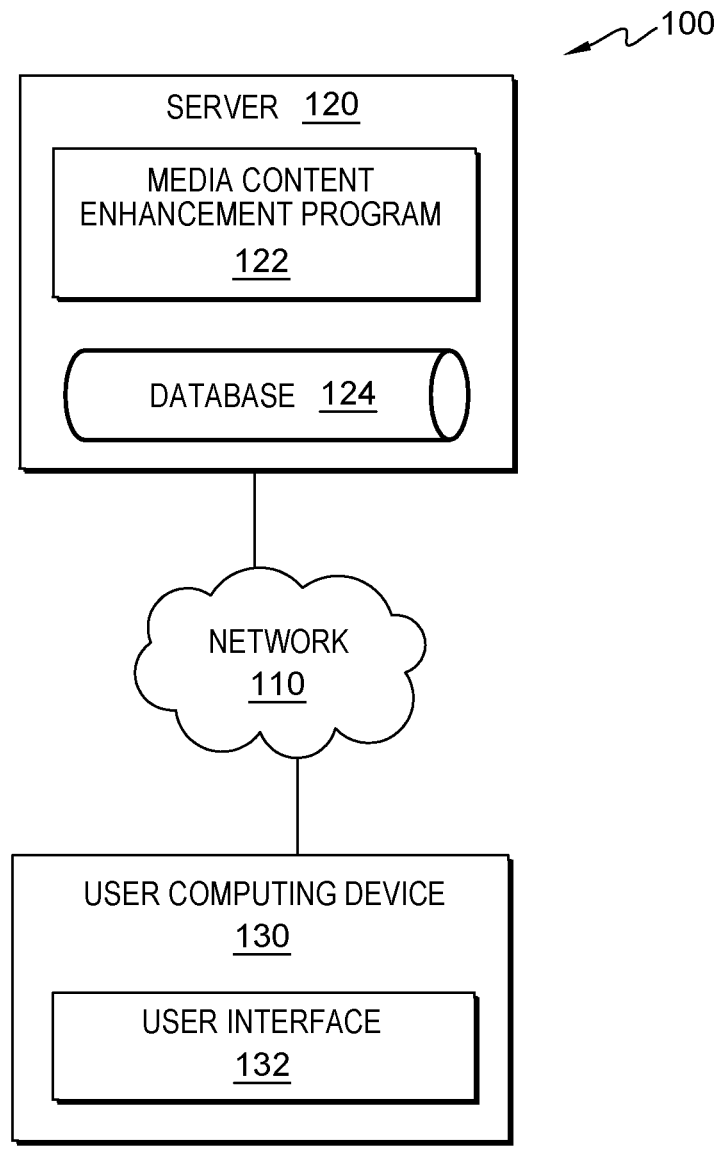
FIG. 1 is a block diagram illustrating a distributed data processing environment, in accordance with an embodiment of the present invention.

Embodiments of the present invention recognize that, when viewing an image or a video (hereinafter a "media content"), a user may want to view the media content with a particular degree of clarity. Although the media content may be stored in a cloud hosted server, the media content may not be of the particular degree of clarity the user wants. Therefore, embodiments of the present invention recognize the need to be able to enhance the media content using a Generative Adversarial Network, or a GAN.

Embodiments of the present invention recognize that a GAN is an approach to generative modeling that uses a deep learning method, such as a convolutional neural network. Generative modeling is an unsupervised learning task in machine learning that involves automatically discovering and learning a regularity or a pattern in input data in such a way that a model can be used to generate and output new examples that plausibly could have been drawn from the original dataset.

Embodiments of the present invention recognize that a GAN is made up of two neural networks: a generator and a discriminator. A GAN trains a generative model by framing a problem as a supervised learning problem using the generator and the discriminator. The generator is a convolutional neural network and the discriminator is a deconvolutional neural network. The goal of the generator is to artificially manufacture outputs (e.g., new examples) that could easily be mistaken for real data. The goal of the discriminator is to classify outputs as either real (i.e., from the domain) or fake (i.e., artificially created). The generator and the discriminator are trained together in a zero-sum game. Essentially, a GAN creates its own training data. As the feedback loop between the adversarial network continues, the generator will begin to produce higher-quality outputs and the discriminator will become better at flagging data that is fake (i.e., artificially created).

Embodiments of the present invention recognize that a GAN is frequently used as a machine learning model to understand and recreate visual content with increasingly remarkable accuracy. Some use cases of GANs include, but are not limited to, filling in images from an outline, generating a realistic image from a text, producing photorealistic depictions of product prototypes, and converting black and white imagery into color. Other use cases of GANs include, but are not limited to, modeling patterns of human behavior and movement within a frame, predicting subsequent video frames, and creating a deepfake. In relation to the present invention, a GAN is used to enhance an image and to create clarity in the objects of the image. Since a video is basically a playing of more than 24 frames per second, and each frame is an image file, a GAN enhances a video in a similar manner.

Embodiments of the present invention recognize that the positioning of a GAN on a cloud-based server is dynamic. In addition to a cloud-based node, a GAN can be distributed into components across an edge-based node. As networks become decentralized, the networks become more amorphous with hybrid devices. Each cloud-based node and edge-based node that is a part of the network sends statistics to a "proof of compute" node. "Proof of compute" means the cloud-based node and/or the edge-based node can fulfill the computation and bandwidth requirements of an algorithm. The "proof of compute" node takes the trended features and forecasts the trends into the future. The future trends are input into a "proof of compute" estimation, which is a feed forward neural network or a similar predictive model. The output of the predictive model provides a probability (i.e., pmc) that the beaconing node can fulfill the compute requirements of the algorithm. $v_t$ is a feature vector of the beaconing node over a certain period of time. Different forecasting windows are input into the predictive model using the following equation:

$$pmc(\overline{v_t})=pc_t$$

Next, the accumulated "proof of compute" series is input into a long short-term memory (LSTM) model for a probability (i.e., pmm) of migration using the following equation:

$$pmm(\overline{pc})=pm$$

$pc_t$ is the valuation of the nodes while pm is the cost of the nodes. This enables our proof of compute algorithm to determine where to run the generator and discriminator with a capacity constraint algorithm.

Embodiments of the present invention seek to ensure that the enhancement of the media content using a GAN occurs at the proper node (i.e., at the edge-based node or the cloud-based node) for maximum efficiency (i.e., for the optimization of pmc and pmm). Embodiments of the present invention recognize that two approaches can be used for the enhancement of the media content using a GAN. One method involves enhancing the media content on a cloud hosted server. This method may require higher network bandwidth to view the media content. Additionally, the cloud service might charge additional fees. However, if the media content is enhanced locally on a user computing device, then additional network bandwidth will not be required and the cloud service will not charge additional fees, but the user computing device may require an appropriate processing memory and battery power.

Therefore, embodiments of the present invention provide a system and method to optimize the enhancement of the media content using a GAN by identifying a location to enhance the media content or by identifying an optimal distribution between the cloud hosted server and the user computing device (i.e., driven by the optimization of pmc and pmm).

Implementation of embodiments of the present invention may take a variety of forms, and exemplary implementation details are discussed subsequently with reference to the Figures.

FIG. 1 is a block diagram illustrating a distributed data processing environment, generally designated 100, in accordance with an embodiment of the present invention. In the depicted embodiment, distributed data processing environment 100 includes server 120 and user computing devices 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing devices 130, and other computing devices (not shown) within distributed data processing environment 100.

Server 120 operates to run media content enhancement program 122 and to send and/or store data in database 124. In an embodiment, server 120 can send data from database 124 to user computing devices 130. In an embodiment, server 120 can receive data in database 124 from user computing devices 130. In one or more embodiments, server 120 can be a standalone computing device, a management server, a web server, a mobile computing device, or any other electronic device or computing system capable of receiving, sending, and processing data and capable of communicating with user computing devices 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing devices 130 and other computing devices (not shown) within distributed data processing environment 100 via network 110. Server 120 may include internal and external hardware components, as depicted and described in further detail in FIG. 3.

Media content enhancement program 122 operates to optimize the enhancement of a media content using a GAN by identifying a location to enhance the media content or by identifying a distribution between the cloud hosted server and the user computing device. In the depicted embodiment, media content enhancement program 122 is a standalone program. In another embodiment, media content enhancement program 122 may be integrated into another software product. In the depicted embodiment, media content enhancement program 122 resides on server 120. In another embodiment, media content enhancement program 122 may reside on user computing devices 130 or on another computing device (not shown), provided that media content enhancement program 122 has access to network 110. The operational steps of media content enhancement program 122 are depicted and described in further detail with respect to FIG. 2.

In an embodiment, the user of user computing devices 130 registers with media content enhancement program 122 of server 120. For example, the user completes a registration process (e.g., user validation), provides information to create a user profile, and authorizes the collection, analysis, and distribution (i.e., opts-in) of relevant data on identified computing devices (e.g., on user computing devices 130) by server 120 (e.g., via media content enhancement program 122). Relevant data includes, but is not limited to, personal information or data provided by the user; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by media content enhancement program 122. A database is an organized collection of data. Data includes, but is not limited to, information about user preferences (e.g., general user system settings such as alert notifications for user computing devices 130); information about alert notification preferences; and any other data received, used, and/or generated by media content enhancement program 122.

Database 124 can be implemented with any type of device capable of storing data and configuration files that can be accessed and utilized by server 120, such as a hard disk drive, a database server, or a flash memory. In an embodiment, database 124 is accessed by media content enhancement program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that media content enhancement program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Media content enhancement program 122 enables the authorized and secure processing of personal data.

Media content enhancement program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Media content enhancement program 122 provides information regarding personal and/or confidential data and the nature (e.g., type, scope, purpose, duration, etc.) of the processing. Media content enhancement program 122 provides the user with copies of stored personal and/or confidential company data. Media content enhancement program 122 allows the correction or completion of incorrect or incomplete personal and/or confidential data. Media content enhancement program 122 allows for the immediate deletion of personal and/or confidential data.

User computing devices 130 operates to each run user interface 132, respectively, through which a user can interact with media content enhancement program 122 on server 120. In an embodiment, user computing devices 130 are each a device that performs programmable instructions. For example, user computing devices 130 may each be an electronic device, such as a laptop computer, a tablet computer, a netbook computer, a personal computer, a desktop computer, a smart phone, or any programmable electronic device capable of running the respective user interface 132 and of communicating (i.e., sending and receiving data) with media content enhancement program 122 via network 110. In general, user computing devices 130 represents any programmable electronic device or a combination of programmable electronic devices capable of executing machine readable program instructions and communicating with other computing devices (not shown) within distributed data processing environment 100 via network 110. In the depicted embodiment, user computing devices 130 includes an instance of user interface 132.

User interface 132 operates as a local user interface between media content enhancement program 122 on server 120 and a user of user computing devices 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from media content enhancement program 122 to a user via network 110. User interface 132 can also display or present alerts including information (such as graphics, text, and/or sound) sent from media content enhancement program 122 to a user via network 110. In an embodiment, user interface 132 is capable of sending and receiving data (i.e., to and from media content enhancement program 122 via network 110, respectively). Through user interface 132, a user can opt-in to media content enhancement program 122; create a user profile; set user preferences and alert notification preferences; input a set of data related to a user computing device (e.g., user computing device 130); select a media content; input a set of data related to the media content; view the pre-defined quality of media content; view the unenhanced media content; view the pre-defined quality of media content is available on the cloud hosted server (e.g., server 120); receive a request for feedback; and input feedback.

A user preference is a setting that can be customized for a particular user. A set of default user preferences are assigned to each user of media content enhancement program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of media content enhancement program 122.

Figure 2:
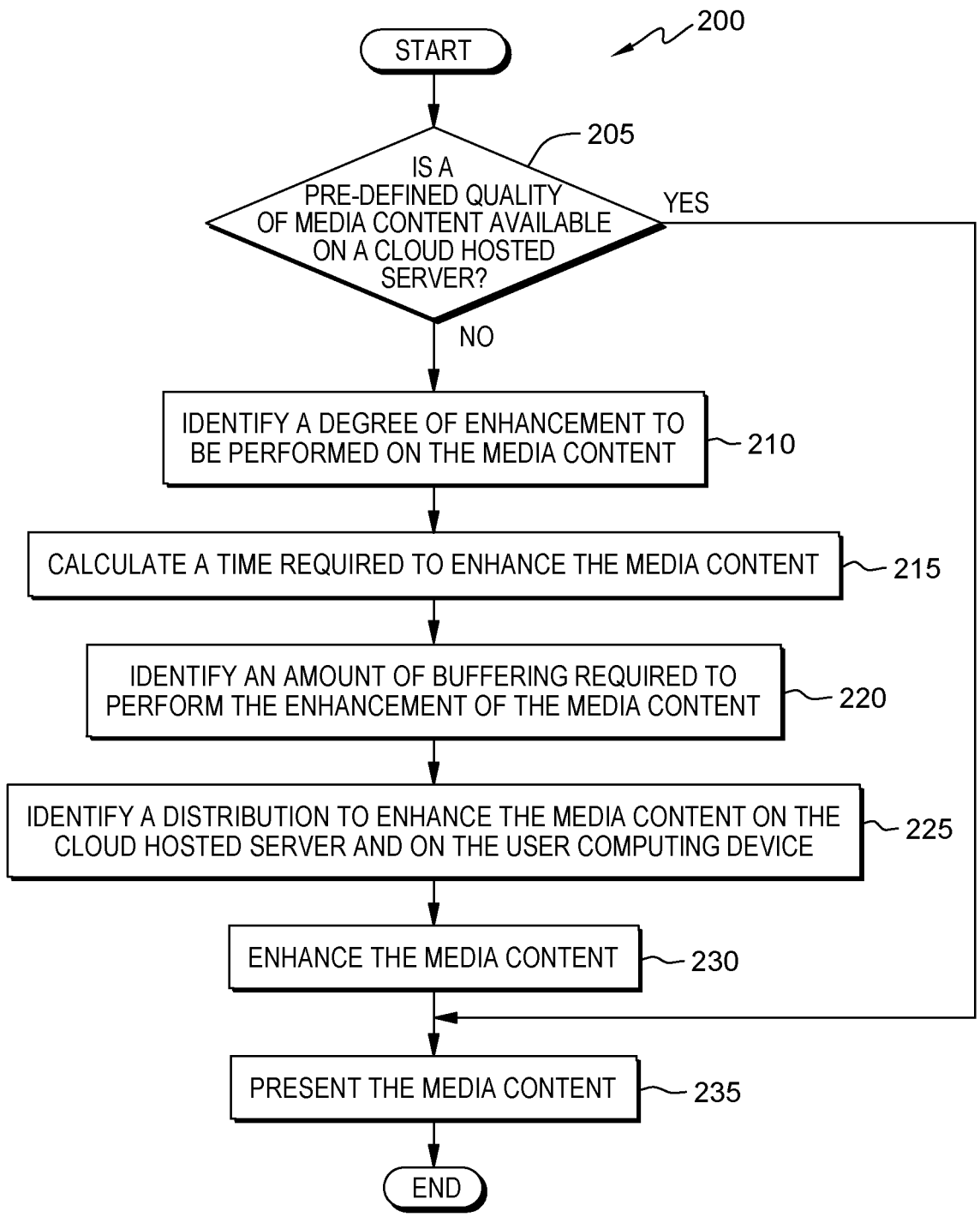
FIG. 2 is a flowchart illustrating the operational steps of a media content enhancement program, on a server within the distributed data processing environment of FIG. 1, in accordance with an embodiment of the present invention.

FIG. 2 is a flowchart, generally designated 200, illustrating the operational steps for media content enhancement program 122, on server 120 within distributed data processing environment 100 of FIG. 1, in accordance with an embodiment of the present invention. In an embodiment, media content enhancement program 122 operates to optimize the enhancement of the media content using a GAN by identifying a location to enhance the media content or by identifying a distribution between the cloud hosted server and the user computing device. It should be appreciated that the process depicted in FIG. 2 illustrates one possible iteration of the process flow, which may be repeated for each media content selected by a user.

Prior to an iteration of the process flow of media content enhancement program 122, media content enhancement program 122 enables a user to input a set of data related to a user computing device (e.g., user computing device 130). In an embodiment, media content enhancement program 122 enables a user to input a set of data related to a user computing device (e.g., user computing device 130) via a user interface (e.g., user interface 132) of the user computing device (e.g., user computing device 130). The set of data related to the user computing device may include, but is not limited to, a set of configurations of the user computing device (e.g., user computing device 130) (e.g., processing memory and power), a network bandwidth of the user computing device (e.g., user computing device 130) (i.e., to stream a pre-defined quality of media content), a data plan of the user computing device (e.g., user computing device 130) (i.e., to watch a streaming of the pre-defined quality of media content), and a cloud service cost (i.e., to enhance the media content to a pre-defined quality).

In decision step 205, responsive to a user selecting a media content and inputting a set of data related to the media content via the user interface (e.g., user interface 132) of the user computing device (e.g., user computing device 130), media content enhancement program 122 determines whether a pre-defined quality of the media content is available on a cloud hosted server (e.g., server 120). In other words, media content enhancement program 122 executes a quality check on the media content to determine if the media content is of a lower quality than is required. In an embodiment, media content enhancement program 122 executes a quality check on the media content using pixels, or other means of determining the quality of the media content which does not exist within a plurality of forms. The media content may include, but is not limited to, one or more images and one or more videos. The set of data related to the media content may include, but is not limited to, a pre-defined quality of the media content from the cloud hosted server (e.g., server 120). In an embodiment, concurrently, media content enhancement program 122 determines whether the user computing device (e.g., user computing device 130) supports the pre-defined quality of media content. If media content enhancement program 122 determines the pre-defined quality of media content is available on the cloud hosted server (e.g., server 120) (decision step 205, YES branch), then media content enhancement program 122 proceeds to step 235, presenting the unenhanced media content to the user.

In step 210, media content enhancement program 122 identifies a degree of enhancement to be performed on the media content. In an embodiment, media content enhancement program 122 identifies a degree of enhancement to be performed on the media content based on the quality check executed in step 205. For example, the media content is available in 1080p resolution but the requested quality is 4K resolution. Media content enhancement program 122 identifies the degree of enhancement to be performed on the media content to obtain the requested quality ok 4K resolution.

In step 215, media content enhancement program 122 calculates a time required to enhance the media content. In an embodiment, media content enhancement program 122 identifies the available network bandwidth. In an embodiment, media content enhancement program 122 determines how much of the media content can be enhanced on the cloud hosted server (e.g., server 120) based on the available network bandwidth.

In an embodiment, responsive to determining the media content can be completely enhanced on the cloud hosted server (e.g., server 120), media content enhancement program 122 determines if the network bandwidth is sufficient for streaming the enhanced media content (i.e., determines if the network is in place and is available to handle a large-scale upgrade, e.g., to handle the enhancement of the media content). In an embodiment, media content enhancement program 122 determines if the network bandwidth is sufficient for streaming the enhanced media content by running a speed check on the network connectivity. In an embodiment, responsive to determining the network bandwidth is sufficient for streaming the enhanced media content, media content enhancement program 122 plans for the enhancement of the media content to occur on the cloud hosted server (e.g., server 120). In an embodiment, media content enhancement program 122 plans for the enhancement of the media content to occur on the cloud hosted server (e.g., server 120) by running a ping test. A ping, or a packet internet or inter-network groper, is a basic internet program that allows a user to test and verify if a particular destination IP address exists and can accept requests in computer network administration. A ping is also used to test and determine how fast a data signal travels from one place, such as a computer, to another place, such as a website. In another embodiment, responsive to determining the media content cannot be completely enhanced on the cloud hosted server (e.g., server 120), media content enhancement program 122 determines whether the user computing device (e.g., user computing device 130) can participate in the enhancement of the media content.

In an embodiment, responsive to determining the user computing device (e.g., user computing device 130) can participate in the enhancement of the media content, media content enhancement program 122 plans for a majority of the enhancement of the media content to occur on the user computing device (e.g., user computing device 130). In an embodiment, media content enhancement program 122 determines whether the user computing device (e.g., user computing device 130) exists in a multi-device ecosystem. A multi-device ecosystem consists of two or more user computing devices (e.g., user computing devices 130) that can participate in GAN execution to enhance the media content. In an embodiment, media content enhancement program 122 determines whether the user computing device (e.g., user computing device 130) exists in the multi-device ecosystem based on the set of data related to a user computing device (e.g., user computing device 130) input by the user. In another embodiment, media content enhancement program 122 determines whether the user computing device (e.g., user computing device 130) exists in the multi-device ecosystem by checking one or more factors. The one or more factors may include, but are not limited to, checking the OS and/or device type in the user profile and checking log-in identification if or where required.

In an embodiment, responsive to determining the user computing device (e.g., user computing device 130) does not exist in a multi-device ecosystem, media content enhancement program 122 identifies a set of configurations (e.g., processing memory and power) of the user computing device (e.g., user computing device 130). In an embodiment, media content enhancement program 122 identifies a set of configurations of the user computing device (e.g., user computing device 130) to estimate a latency in the user computing device (e.g., user computing device 130) to enhance the media content. In computer networking, latency is an expression of how much time it takes for a data packet to travel from one designated point to another. Ideally, latency will be as close to zero as possible.

In another embodiment, responsive to determining the user computing device (e.g., user computing device 130) exists in a multi-device ecosystem, media content enhancement program 122 identifies a set of configurations (e.g., processing memory and power) of each user computing device (e.g., user computing device 130) in the multi-device ecosystem. In an embodiment, media content enhancement program 122 identifies a set of configurations of each user computing device (e.g., user computing device 130) in the multi-device ecosystem to estimate a latency of each user computing device (e.g., user computing device 130) to enhance the media content.

In an embodiment, media content enhancement program 122 compares the latency of the user computing device (e.g., user computing device 130) and the network bandwidth. In an embodiment, media content enhancement program 122 considers how much of the media content can be enhanced based on the available network bandwidth. In an embodiment, media content enhancement program 122 calculates a partial enhancement of the media content on the cloud hosted server (e.g., server 120). For example, a partial enhancement of the media content on the cloud hosted server (e.g., server 120) may be 25% (i.e., low), 50% (i.e., medium), 75% (i.e., high), or 100% (i.e., complete).

In step 220, media content enhancement program 122 identifies an amount of buffering required to perform the enhancement of the media content. The buffer prevents interruptions in the media content. In an embodiment, media content enhancement program 122 optimizes the GAN execution on the cloud hosted server (e.g., server 120) so that the buffering can be performed while streaming the media content.

In step 225, media content enhancement program 122 identifies a distribution to enhance the media content on the cloud hosted server (e.g., server 120) and on the user computing device (e.g., user computing device 130). In another embodiment, media content enhancement program 122 identifies a distribution to enhance the media content on the cloud hosted server (e.g., server 120) and on each user computing device (e.g., user computing device 130) in the multi-device ecosystem.

In step 230, media content enhancement program 122 enhances the media content. In an embodiment, media content enhancement program 122 enhances the media content using a GAN.

In step 235, media content enhancement program 122 presents the media content to the user via the user interface (e.g., user interface 132) of the user computing device (e.g., user computing device 130). In an embodiment, responsive to determining the pre-defined quality of media content is available on the cloud hosted server (e.g., server 120) (decision step 220, YES branch), media content enhancement program 122 presents the unenhanced media content to the user. In an embodiment, responsive to enhancing the media content (step 230), media content enhancement program 122 presents the enhanced media content to the user.

Figure 3:
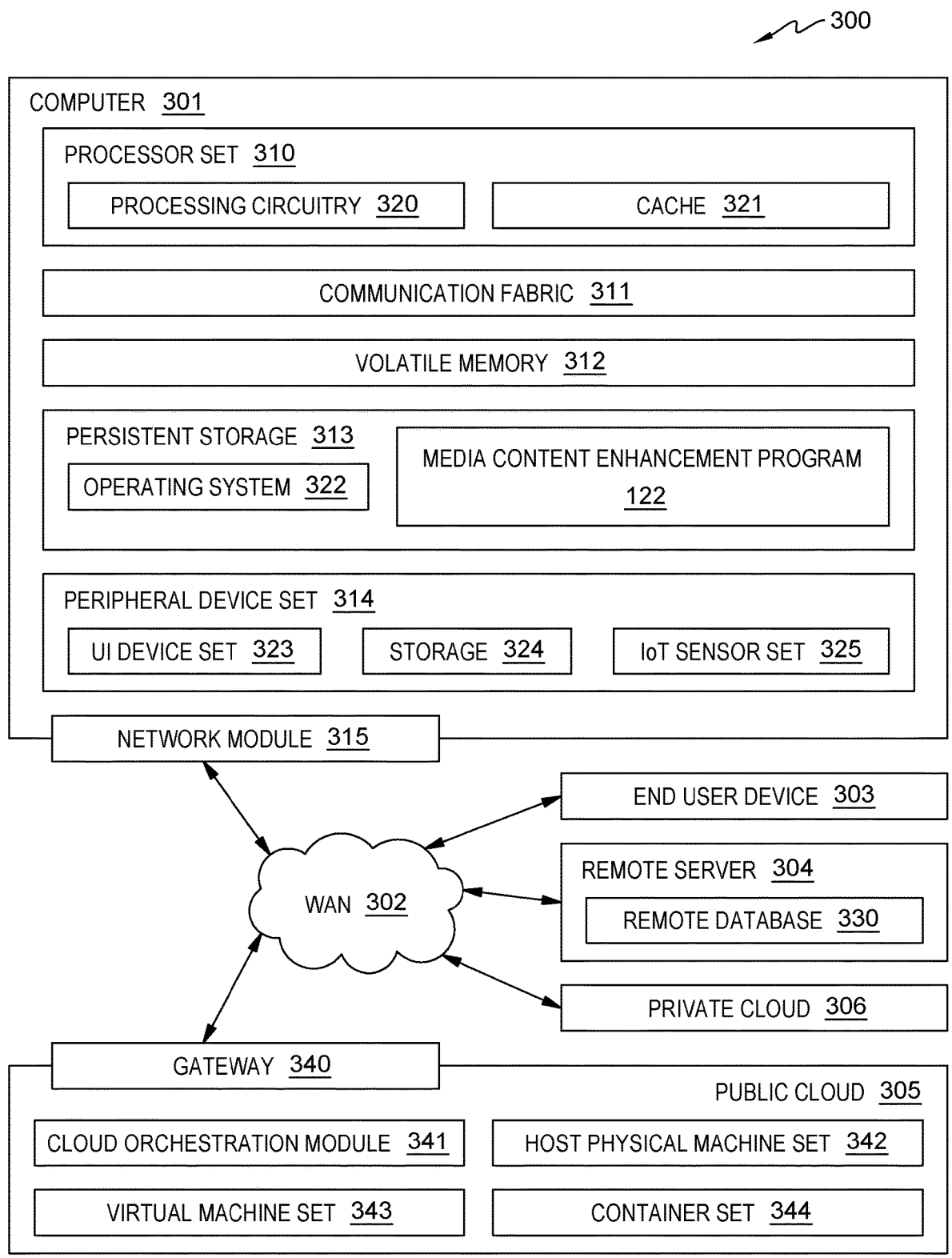
FIG. 3 is a block diagram illustrating the components of the server within the distributed data processing environment of FIG. 1, in accordance with an embodiment of the present invention.

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as media content enhancement program 122. In addition to media content enhancement program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and media content enhancement program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in media content enhancement program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in media content enhancement program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to determining a media content of a defined quality is unavailable on a cloud hosted server, identifying, by one or more processors, a degree of enhancement to be performed on the media content to attain the defined quality;
    calculating, by one or more processors, a length of time required to enhance the media content to the degree of enhancement identified considering one or more factors;
    identifying, by one or more processors, a buffer required to enhance the media content to the degree of enhancement identified, wherein the buffer prevents an interruption in the media content;
    identifying, by one or more processors, a distribution to enhance the media content between a cloud hosted server and the user computing device; and
    enhancing, by one or more processors, the media content according to the distribution identified.

2. The computer-implemented method of claim 1, wherein the one or more factors are selected from a group consisting of a set of configurations of the user computing device, a network bandwidth of the user computing device, a data plan of the user computing device, and a cloud service cost.

3. The computer-implemented method of claim 1, wherein calculating the length of time required to enhance the media content further comprises:
    identifying, by one or more processors, an available network bandwidth;
    responsive to determining the media content can be enhanced on the cloud hosted server based on the available network bandwidth, determining, by one or more processors, the network bandwidth can stream an enhanced media content; and
    planning, by one or more processors, to perform a Generative Adversarial Network (GAN) based enhancement of the media content on the cloud hosted server.

4. The computer-implemented method of claim 1, wherein calculating the length of time required to enhance the media content further comprises:
    identifying, by one or more processors, the available network bandwidth;
    responsive to determining the media content cannot be completely enhanced on the cloud hosted server based on the available network bandwidth, determining, by one or more processors, the Generative Adversarial Network (GAN) based enhancement of the media content can be performed on the user computing device; and
    planning, by one or more processors, to perform the GAN based enhancement of the media content on the cloud hosted server and the user computing device.

5. The computer-implemented method of claim 4, wherein planning to perform the GAN based enhancement of the media content on the cloud hosted server and the user computing device further comprises:
    determining, by one or more processors, the user computing device does not exist in a multi-device ecosystem;
    identifying, by one or more processors, a set of configurations of the user computing device;
    estimating, by one or more processors, a latency of the user computing device to enhance the media content; and
    determining, by one or more processors, how much of the media content can be enhanced on the network bandwidth based on a comparison between the latency of the user computing device and the network bandwidth.

6. The computer-implemented method of claim 4, wherein planning to perform the GAN based enhancement of the media content on the cloud hosted server and the user computing device further comprises:
    determining, by one or more processors, the user computing device exists in a multi-device ecosystem;
    identifying, by one or more processors, a set of configurations of each user computing device in the multi-device ecosystem; and
    estimating, by one or more processors, a latency of each user computing device in the multi-device ecosystem to enhance the media content.

7. The computer-implemented method of claim 1, further comprising:
    subsequent to enhancing the media content, presenting, by one or more processors, an enhanced version of the media content.

8. A computer program product comprising:
    one or more computer readable storage media and program instructions collectively stored on the one or more computer readable storage media, the program instructions comprising:
    responsive to determining a media content of a defined quality is unavailable on a cloud hosted server, program instructions to identify a degree of enhancement to be performed on the media content to attain the defined quality;
    program instructions to calculate a length of time required to enhance the media content to the degree of enhancement identified considering one or more factors;
    program instructions to identify a buffer required to enhance the media content to the degree of enhancement identified, wherein the buffer prevents an interruption in the media content;
    program instructions to identify a distribution to enhance the media content between a cloud hosted server and the user computing device; and
    program instructions to enhance the media content according to the distribution identified.

9. The computer program product of claim 8, wherein the one or more factors are selected from a group consisting of a set of configurations of the user computing device, a network bandwidth of the user computing device, a data plan of the user computing device, and a cloud service cost.

10. The computer program product of claim 8, wherein calculating the length of time required to enhance the media content further comprises:
program instructions to identify an available network bandwidth;
responsive to determining the media content can be enhanced on the cloud hosted server based on the available network bandwidth, program instructions to determine the network bandwidth can stream an enhanced media content; and
program instructions to plan to perform a Generative Adversarial Network (GAN) based enhancement of the media content on the cloud hosted server.

11. The computer program product of claim 8, wherein calculating the length of time required to enhance the media content further comprises:
program instructions to identify the available network bandwidth;
responsive to determining the media content cannot be completely enhanced on the cloud hosted server based on the available network bandwidth, program instructions to determine the Generative Adversarial Network (GAN) based enhancement of the media content can be performed on the user computing device; and
program instructions to plan to perform the GAN based enhancement of the media content on the cloud hosted server and the user computing device.

12. The computer program product of claim 11, wherein planning to perform the GAN based enhancement of the media content on the cloud hosted server and the user computing device further comprises:
program instructions to determine the user computing device does not exist in a multi-device ecosystem;
program instructions to identify a set of configurations of the user computing device;
program instructions to estimate a latency of the user computing device to enhance the media content; and
program instructions to determine how much of the media content can be enhanced on the network bandwidth based on a comparison between the latency of the user computing device and the network bandwidth.

13. The computer program product of claim 11, wherein planning to perform the GAN based enhancement of the media content on the cloud hosted server and the user computing device further comprises:
program instructions to determine the user computing device exists in a multi-device ecosystem;
program instructions to identify a set of configurations of each user computing device in the multi-device ecosystem; and
program instructions to estimate a latency of each user computing device in the multi-device ecosystem to enhance the media content.

14. The computer program product of claim 8, further comprising:
subsequent to enhancing the media content, program instructions to present an enhanced version of the media content.

15. A computer system comprising:
one or more computer processors;
one or more computer readable storage media;
program instructions collectively stored on the one or more computer readable storage media for execution by at least one of the one or more computer processors, the stored program instructions comprising:
responsive to determining a media content of a defined quality is unavailable on a cloud hosted server, program instructions to identify a degree of enhancement to be performed on the media content to attain the defined quality;
program instructions to calculate a length of time required to enhance the media content to the degree of enhancement identified considering one or more factors;
program instructions to identify a buffer required to enhance the media content to the degree of enhancement identified, wherein the buffer prevents an interruption in the media content;
program instructions to identify a distribution to enhance the media content between a cloud hosted server and the user computing device; and
program instructions to enhance the media content according to the distribution identified.

16. The computer system of claim 15, wherein calculating the length of time required to enhance the media content further comprises:
program instructions to identify an available network bandwidth;
responsive to determining the media content can be enhanced on the cloud hosted server based on the available network bandwidth, program instructions to determine the network bandwidth can stream an enhanced media content; and
program instructions to plan to perform a Generative Adversarial Network (GAN) based enhancement of the media content on the cloud hosted server.

17. The computer system of claim 15, wherein calculating the length of time required to enhance the media content further comprises:
program instructions to identify the available network bandwidth;
responsive to determining the media content cannot be completely enhanced on the cloud hosted server based on the available network bandwidth, program instructions to determine the Generative Adversarial Network (GAN) based enhancement of the media content can be performed on the user computing device; and
program instructions to plan to perform the GAN based enhancement of the media content on the cloud hosted server and the user computing device.

18. The computer system of claim 17, wherein planning to perform the GAN based enhancement of the media content on the cloud hosted server and the user computing device further comprises:
program instructions to determine the user computing device does not exist in a multi-device ecosystem;
program instructions to identify a set of configurations of the user computing device;
program instructions to estimate a latency of the user computing device to enhance the media content; and
program instructions to determine how much of the media content can be enhanced on the network bandwidth based on a comparison between the latency of the user computing device and the network bandwidth.

19. The computer system of claim 17, wherein planning to perform the GAN based enhancement of the media content on the cloud hosted server and the user computing device further comprises:

program instructions to determine the user computing device exists in a multi-device ecosystem;

program instructions to identify a set of configurations of each user computing device in the multi-device ecosystem; and program instructions to estimate a latency of each user computing device in the multi-device ecosystem to enhance the media content.

20. The computer system of claim 15, further comprising:

subsequent to enhancing the media content, program instructions to present an enhanced version of the media content.

* * * * *